US008943044B1

(12) United States Patent
Saylor et al.

(10) Patent No.: US 8,943,044 B1
(45) Date of Patent: Jan. 27, 2015

(54) ANALYZING EVENT INVITEES

(71) Applicant: MicroStrategy Inc., Vienna, VA (US)

(72) Inventors: Michael J. Saylor, Vienna, VA (US); Hector Vazquez, Ashburn, VA (US)

(73) Assignee: MicroStrategy Incorporated, Vienna, VA (US)

( * ) Notice: Subject to any disclaimer, the term of this patent is extended or adjusted under 35 U.S.C. 154(b) by 84 days.

(21) Appl. No.: 13/661,763

(22) Filed: Oct. 26, 2012

(51) Int. Cl.
*G06F 17/30* (2006.01)

(52) U.S. Cl.
CPC ................................ *G06F 17/30554* (2013.01)
USPC ........................................................ 707/722

(58) Field of Classification Search
CPC ................................................ G06F 17/30132
USPC .................... 707/808, 722; 709/204; 434/322
See application file for complete search history.

(56) References Cited

U.S. PATENT DOCUMENTS

| | | | | |
|---|---|---|---|---|
| 6,732,103 | B1 * | 5/2004 | Strick et al. | 1/1 |
| 2006/0099561 | A1 * | 5/2006 | Griph | 434/322 |
| 2010/0082491 | A1 | 4/2010 | Rosenblatt et al. | |
| 2010/0088372 | A1 * | 4/2010 | Shridhar et al. | 709/204 |
| 2012/0197949 | A1 * | 8/2012 | Taylor et al. | 707/808 |

* cited by examiner

*Primary Examiner* — Etienne Leroux
(74) *Attorney, Agent, or Firm* — Fish & Richardson P.C.

(57) ABSTRACT

In one implementation, a plurality of identifiers is obtained, where each identifier corresponds to an invitee to an event. Then a user profile for each of the plurality of identifiers is obtained, where each user profile comprises a value for each of a plurality of characteristics. Next, aggregate data representing the values from the user profiles for one or more selected characteristics is generated. Finally, a representation of the aggregate data is outputted.

20 Claims, 7 Drawing Sheets

ANALYZING EVENT INVITEES

TECHNICAL FIELD

This specification generally relates to analyzing event invitees.

BACKGROUND

Event hosts may consider many different aspects of potential invitees when deciding whom to invite to an event.

SUMMARY

In general, one aspect of the subject matter described in this specification may include the actions of obtaining, at a processor, a plurality of identifiers, each identifier corresponding to an invitee to an event, obtaining, at the processor, a user profile for each of the plurality of identifiers, wherein each user profile comprises a value for each of a plurality of characteristics, and generating, at the processor, aggregate data representing the values from the user profiles for one or more selected characteristics, outputting, for display on a client device, a representation of the aggregate data.

In some implementations, obtaining, at a processor, a plurality of identifiers, each identifier corresponding to an invitee to an event comprises obtaining, at a processor, a plurality of identifiers, each identifier corresponding to an invitee to an event, wherein the plurality of identifiers comprises identifiers for all of the invitees to the event, and obtaining, at the processor, a user profile for each of the plurality of identifiers, wherein each user profile comprises a value for each of a plurality of characteristics comprises obtaining, at the processor, a user profile for all of the invitees to the event, wherein each user profile comprises a value for each of a plurality of characteristics.

In some implementations, obtaining, at a processor, a plurality of identifiers, each identifier corresponding to an invitee to an event comprises obtaining, at a processor, a plurality of identifiers, each identifier corresponding to an invitee to an event, wherein the plurality of identifiers comprises identifiers for all of the invitees who have accepted invitations to the event, and obtaining, at the processor, a user profile for each of the plurality of identifiers, wherein each user profile comprises a value for each of a plurality of characteristics comprises obtaining, at the processor, a user profile for all of the invitees who have accepted invitations to the event, wherein each user profile comprises a value for each of a plurality of characteristics.

In some implementations, obtaining, at a processor, a plurality of identifiers, each identifier corresponding to an invitee to an event comprises obtaining, at a processor, a plurality of identifiers, each identifier corresponding to an invitee to an event, wherein the plurality of identifiers comprises identifiers for all of the invitees who have tentatively accepted invitations to the event, and obtaining, at the processor, a user profile for each invitee to the event, wherein each user profile comprises a value for each of a plurality of characteristics comprises obtaining, at the processor, a user profile for all of the invitees who have tentatively accepted invitations to the event, wherein each user profile comprises a value for each of a plurality of characteristics.

In some implementations, obtaining, at a processor, a plurality of identifiers, each identifier corresponding to an invitee to an event comprises obtaining, at a processor, a plurality of identifiers, each identifier corresponding to an invitee to an event, wherein the plurality of identifiers comprises identifiers for all of the invitees who have declined invitations to the event, and obtaining, at the processor, a user profile for each of the plurality of identifiers, wherein each user profile comprises a value for each of a plurality of characteristics comprises obtaining, at the processor, a user profile for all of the invitees who have declined invitations to the event, wherein each user profile comprises a value for each of a plurality of characteristics.

In some implementations, obtaining, at a processor, a plurality of identifiers, each identifier corresponding to an invitee to an event comprises obtaining, at a processor, a plurality of identifiers, each identifier corresponding to an invitee to an event, wherein the plurality of identifiers comprises identifiers for all of the invitees who have not responded to invitations to the event, and obtaining, at the processor, a user profile for each of the plurality of identifiers, wherein each user profile comprises a value for each of a plurality of characteristics comprises obtaining, at the processor, a user profile for all of the invitees who have not responded to invitations to the event, wherein each user profile comprises a value for each of a plurality of characteristics.

In some implementations, obtaining, at a processor, a plurality of identifiers, each identifier corresponding to an invitee to an event comprises obtaining, at a processor, a plurality of identifiers, each identifier corresponding to an invitee to an event, wherein the plurality of identifiers comprises identifiers for all of the invitees who attended the event, and obtaining, at the processor, a user profile for each of the plurality of identifiers, wherein each user profile comprises a value for each of a plurality of characteristics comprises obtaining, at the processor, a user profile for all of the invitees who attended the event, wherein each user profile comprises a value for each of a plurality of characteristics.

In some implementations, obtaining, at a processor, a plurality of identifiers, each identifier corresponding to an invitee to an event comprises obtaining, at a processor, a plurality of identifiers, each identifier corresponding to an invitee to an event, wherein the plurality of identifiers comprises identifiers for all of the invitees who are currently attending the event, and obtaining, at the processor, a user profile for each of the plurality of identifiers, wherein each user profile comprises a value for each of a plurality of characteristics comprises obtaining, at the processor, a user profile for all of the invitees who are currently attending the event, wherein each user profile comprises a value for each of a plurality of characteristics.

In some implementations, generating, at the processor, aggregate data representing the values from the user profiles for one or more selected characteristics comprises generating, at the processor, aggregate data representing the values from the user profiles for at least one of an age, a gender, a relationship status, or a set of interests.

In some implementations, obtaining, at the processor, a user profile for each of the plurality of identifiers, wherein each user profile comprises a value for each of a plurality of characteristics, comprises obtaining, at the processor from an electronic social networking platform, a user profile for each invitee to the event, wherein each user profile comprises a value for each of a plurality of characteristics.

In some implementations, at least one value for one or more of the plurality of characteristics for one or more of the user profiles is undeclared, and generating, at the processor, aggregate data representing the values from the user profiles for one or more selected characteristics comprises excluding user profiles associated with undeclared values for the one or more selected characteristics.

In some implementations, outputting, for display on a client device, a representation of the aggregate data comprises rendering, on a display of a client device associated with a host of the event, a representation of the aggregate data.

In some implementations, outputting, for display on a client device, a representation of the aggregate data comprises transmitting, to a client device associated with a host of the event, a representation of the aggregate data for rendering on a display of the client device.

Other features may include corresponding systems, apparatus, and computer programs encoded on computer storage devices configured to perform the foregoing actions.

The details of one or more implementations are set forth in the accompanying drawings and the description, below. Other features will be apparent from the description and drawings, and from the claims.

DETAILED DESCRIPTION

Event hosts may desire to leverage information from a social networking platform or multiple social networking platforms when analyzing information about invitees to an event. Events can be, among other things, any gathering of people at a specified date, time, and location, and an event host can be any entity (e.g., a person or organization) that is planning an event. A social intelligence service that aggregates and analyzes information about other invitees from one or more social networking platforms therefore may be advantageous. For example, such an application may allow an event host to analyze user profiles of invitees based on various characteristics.

The event host may analyze user profiles of invitees before the event. For example, the event host may be able to analyze the characteristics of all invitees, confirmed invitees, tentative invitees, declined invitees, and/or non-responsive invitees. Analyzing the invitees by RSVP status in this manner may enable the event host to invite more invitees with certain targeted characteristics if the event host discovers that disproportionately high or low numbers of invitees having certain characteristics are planning to attend the event.

The event host may also analyze user profiles of invitees during the event, for example, to consider the demographics of attendees who are currently attending the event (e.g., invitees who have checked into the event and have not yet checked out of the event). Such analysis may enable the event host to invite more invitees having certain targeted characteristics if the event host determines that a disproportionately high or low numbers of invitees with specific characteristics are currently attending the event.

Furthermore, the event host may analyze user profiles of invitees after the event, for example, to understand the characteristics of the invitees who actually attended the event. Such analysis may enable the event host to identify types of invitees who were interested enough to attend the event, thereby enabling the event host to make more informed decisions about whom to invite to future events.

An application (e.g., a mobile application) for accessing such a social intelligence service is described below. First, a general description of example implementations will be described. Then, more detailed implementations are described.

Figure 1B:
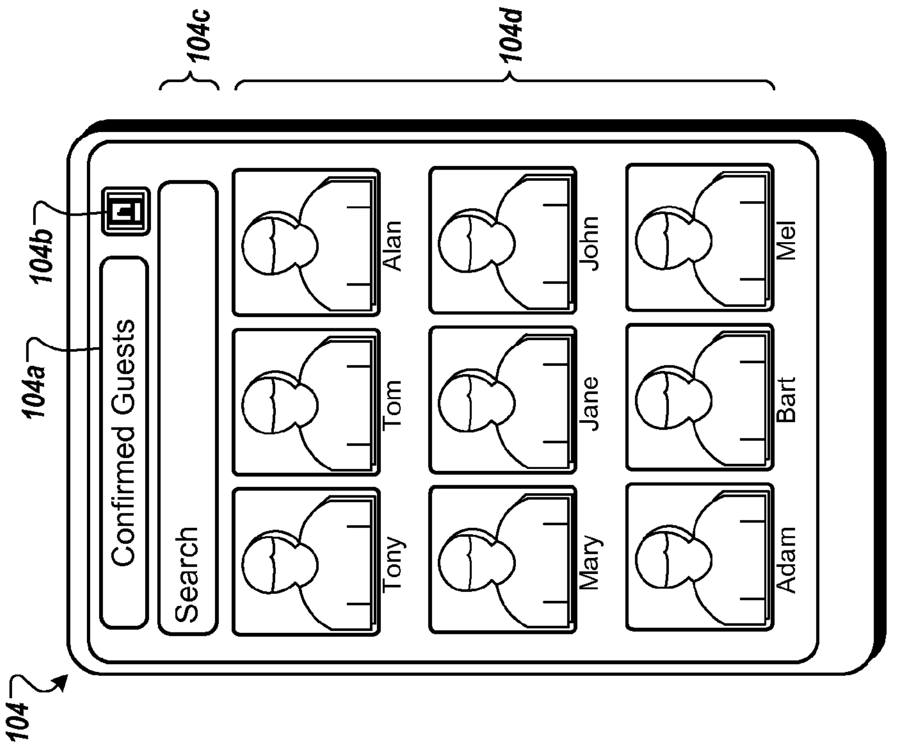
FIGS. 1A to 1F are sample screenshots of an example of an application for analyzing user profiles of invitees to an event.
Figure 1A:
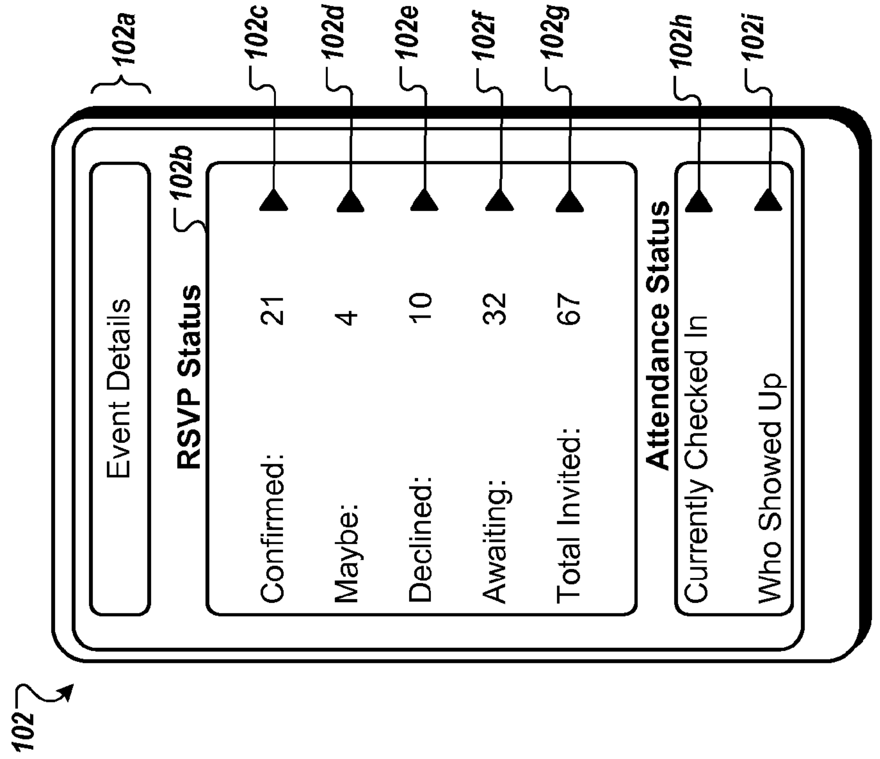

FIGS. 1A to 1F show sample screenshots of a mobile application for analyzing user profiles of invitees to an event. FIG. 1A shows a screenshot 102 of a sample user interface for an event host to view the status of invitees to an event. The user interface includes a caption 102*a* showing that the event host is on an "Event Details" page. The interface also includes aggregate invitation status data 102*b* indicating that 21 invitees are in a "Confirmed" status (e.g., have accepted invitations), 4 invitees are in a "Maybe" status (e.g., have tentatively accepted invitations), 10 invitees are in a "Declined" status (e.g., have declined invitations), 32 invitees are in an "Awaiting" status (e.g., have not responded to invitations), and 67 invitees have been invited in total (i.e., the "Total Invited").

Additionally, the interface includes a set of command buttons that allow the event host to view details on invitee status information. In particular, when the event host selects one of the invitee status information command buttons 102*c*, 102*d*, 102*e*, 102*f*, 102*g*, the mobile application navigates to a display of a list of the invitees to the event who satisfy the selected status indicator. Thus, selection of the "Confirmed" invitees button 102*c* causes the mobile application to display a list of invitees who have accepted invitations; selection of the "Maybe" invitees button 102*d* causes the mobile application to display a list of invitees who have tentatively accepted invitations; selection of the "Declined" invitees button 102*e* causes the mobile application to display a list of invitees who have declined invitations; selection of the "Awaiting" invitees button 102*f* causes the mobile application to display a list of invitees who have neither accepted nor declined invitations; and selection of the "Total Invited" invitees button 102*g* causes the mobile application to display a list of all the invitees to the event.

Another set of controls allows the event host to view information regarding current attendance at an event. A "Currently Checked In" command button 102*h* causes the mobile application to display a list of user profiles of invitees who are presently checked in to the event (e.g., invitees who have checked into the event and have not yet checked out of the event). As described in more detail below, the mobile application can access an event management service executing on a server that maintains a "checked-in" and "checked-out" status for the invitees. Finally, a "Who Showed Up" command button 102*i* causes the mobile application to display a list of user profiles of invitees who attended the event. This information may also be obtained from the event management service. In some implementations, a number of invitees who are currently checked into the event may be displayed in connection with "Currently Checked In" command button 102*h* and a number of invitees who attended the event may be displayed in connection with "Who Showed Up" command button 102*i*.

FIG. 1B shows a screenshot 104 of a sample of a user interface displayed by the mobile application in response to an event host selecting the "Confirmed" button 102*c*. The user interface includes a caption identifying the screen as the "Confirmed Guests" screen 104*a*, an analysis command button 104*b*, a search input box 104*c*, and a collection of representations of user profiles 104*d* for all invitees to the event.

The analysis command button 104*b* allows the event host to analyze various characteristics of the invitees to the event (e.g., based on information about the invitees available from one or more social networking platforms). In particular, the analysis command button 104*b* causes the mobile application to present an interface that displays demographic information relating to the invitees that satisfy the respective invitee status (e.g., demographic information from the user profiles of invitees who have accepted invitations when the event host selects the "Confirmed" invitees button 102*c*; demographic information from the user profiles of invitees who have tentatively accepted invitations when the event host selects the "Maybe" invitees button 102*d*; demographic information from the user profiles of invitees who have declined invitations when the event host selects the "Declined" invitees button 102*e*; demographic information from the user profiles of invitees who have neither accepted nor declined invitations when the event host selects the "Awaiting" invitees button 102*f*; and demographic information from the user profiles of all invitees when the event host selects the "Total Invited" invitees button 102*g*). Sample screenshots of various analyses are discussed below.

The search input box 104*c* permits the event host to perform a text search, which may locate, for example, invitees to the event who have names matching the search term, and/or invitees to the event who have interests (e.g., interests recorded with one or more social networking platforms) matching the search term. The search results can then be analyzed with reference to various characteristics as described below. For example, if the event host entered a specific interest (e.g., "MicroStrategy"), then only invitees to the event who have identified "MicroStrategy" as an interest in their user profiles may be analyzed. If the event host entered a name or portion of a name (e.g., "Smith"), then only invitees to the event who have "Smith" as a name in their user profiles may be analyzed.

The representations 104*d* correspond to user profiles for nine confirmed invitees to the event (e.g., Tony, Tom, Alan, Mary, Jane, John, Adam, Bart, and Mel). While only nine representations are shown for exemplary purposes, any number of representations could be displayed. If the representations do not fit entirely on the display of the client device, the interface may include a scrollable view (e.g., a vertical or horizontal scrolling viewport) or a paging mode that restricts scrolling to a single screen of representations at a time, so that the event host can browse through any number of representations. For example, as illustrated in FIG. 1B, representations 104*d* of user profiles for only nine confirmed invitees to the event are shown. However, twenty one invitees have confirmed that they will be attending the event. Therefore, the interface may include a scrollable view, a paging mode, etc. to enable the event host to browse the representations of all twenty one invitees who have confirmed that they will be attending the event. The representations 104*d* may include icons, photos, or other graphical representations for all the confirmed invitees to the event, and also may include names associated with each member. Similar user interfaces would be displayed in response to selection of the "Maybe" invitees button 102*d*, the "Declined Invitees" button 102*e*, the "Awaiting" invitees button 102*f*, and the "Total Invited" invitees button 102*g*, the "Currently Checked In" button 102*h*, and the "Who Showed Up" button 102*i*, except that the representations of user profiles would only include user profiles that satisfy the respective invitee status.

Figure 1D:
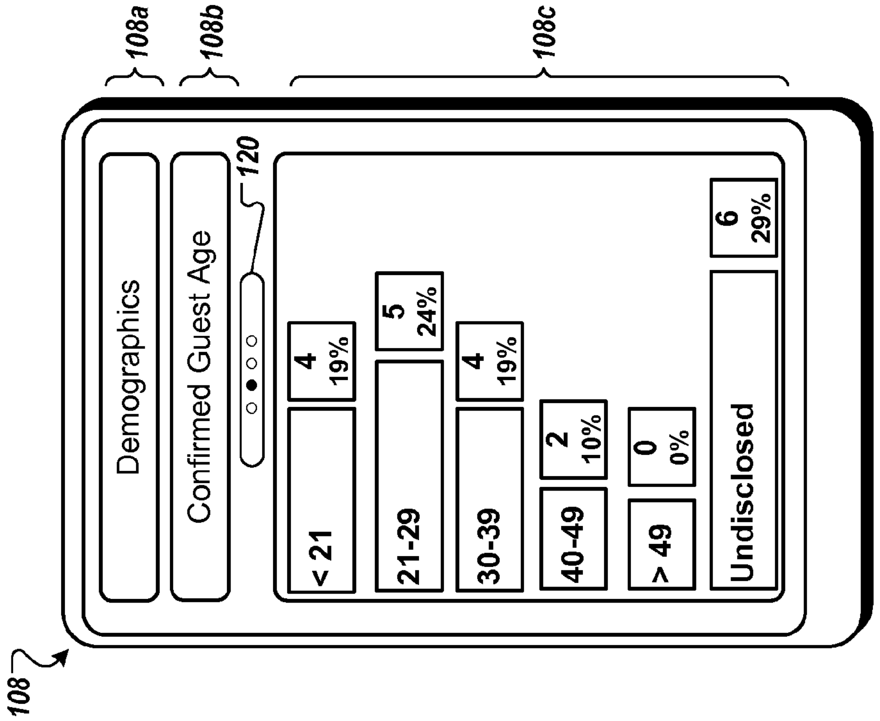
Figure 1C:
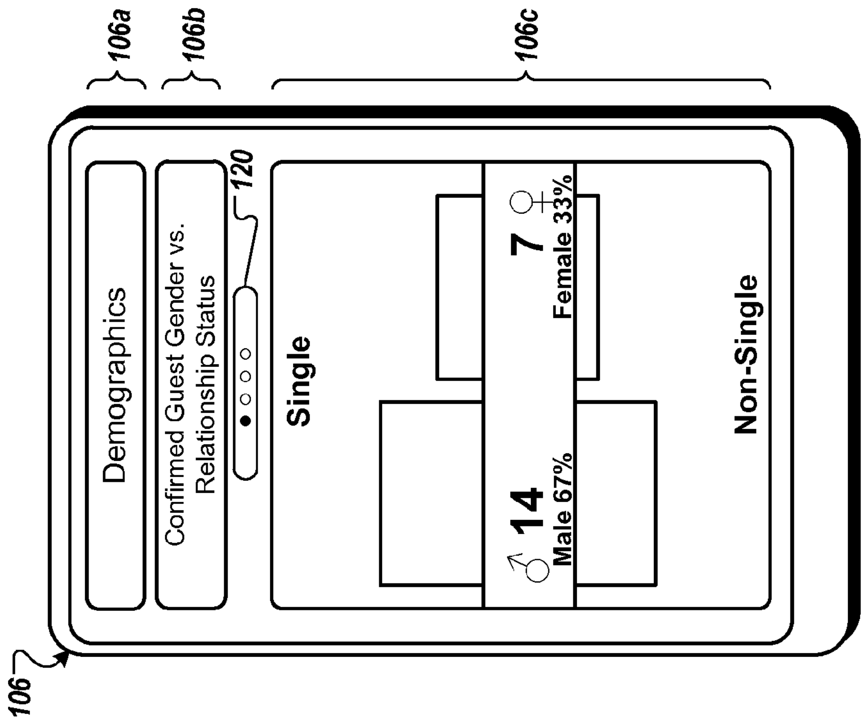
Figure 1F:
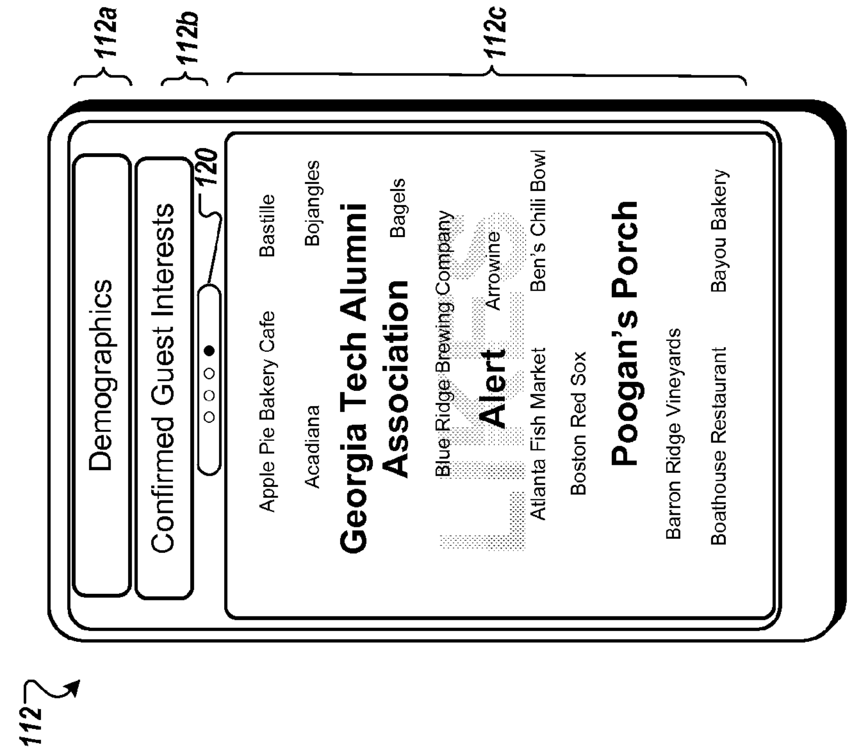
Figure 1E:
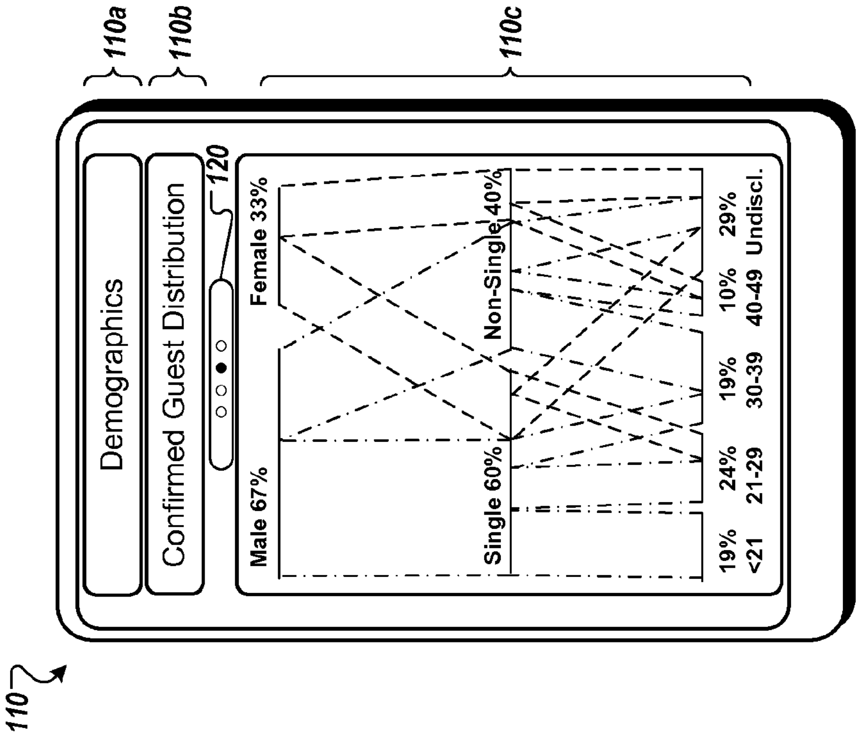

When the event host selects analysis command button 104*b*, the mobile application navigates to the analysis screens illustrated in FIGS. 1C to 1F. On these screens, the mobile application is configured to enable the event host to select between, for example, four analysis modes by inputting a gesture, e.g., swiping slider 120 shown in FIGS. 1C to 1F. The first position of the slider 120 causes the application to display a user interface as shown in FIG. 1C that provides an analysis of gender vs. relationship status for confirmed invitees. The second position of the slider 120 causes the application to display a user interface as shown in FIG. 1D that provides an analysis of ages of confirmed invitees. The third position of the slider 120 causes the application to display a user interface as shown in FIG. 1E that provides an analysis (e.g., using a parallel sets visualization) of distributions of genders, relationship statuses, and ages of confirmed invitees. The fourth position of the slider 120 causes the application to display a user interface as shown in FIG. 1F that provides an analysis of interests of confirmed invitees. While four analysis modes for analyzing different characteristics of invitees to the event are shown for example purposes, any suitable number of modes and analyses could be implemented.

Referring specifically now to FIG. 1C, FIG. 1C shows a screenshot 106 of a sample user interface showing an analysis of gender (e.g., "Male" or "Female") vs. relationship status (e.g., "Single" or "Non-Single") for confirmed invitees. The user interface includes a caption 106*a* indicating that the screen shows "Demographics" information, and a caption 106*b* indicating that the information is "Confirmed Guest Gender vs. Relationship Status" in particular. The chart 106*c* illustrates gender and relationship status of confirmed invitees. For this example, the chart includes a box in the center indicating on the left side of the box that 14 male invitees (e.g., 67% of the 21 confirmed invitees) have confirmed that they will attend, and on the right side of the box that 7 female invitees (e.g., 33% of the 21 confirmed invitees) have confirmed that they will attend. Also, the chart 106*c* visually indicates that more of both the male and female confirmed invitees are "Single" than "Non-Single." In particular, the chart includes a bar graph on the "Male" portion side that is longer in the "Single" dimension than in the "Non-Single" dimension, where the total length of the "Male" bar chart in both the "Single" and "Non-Single" dimensions is proportional to the number of confirmed "Male" invitees. Likewise, the chart includes a bar graph on the "Female" portion side that is longer in the "Single" dimension than in the "Non-Single" dimension, where the total length of the "Female" bar chart in both the "Single" and "Non-Single" dimensions is proportional to the number of confirmed "Female" invitees. As shown, the bar chart for confirmed "Female" invitees is shorter in total length than the bar chart for confirmed "Male" invitees because there are fewer total confirmed female invitees than confirmed male invitees. The chart 106*c* therefore provides an event host with a quick and readily understandable visual indication of the proportion of male vs. female, and single vs. non-single confirmed invitees.

FIG. 1D shows a screenshot 108 of a sample user interface showing an analysis of the ages of confirmed invitees. The user interface includes a caption 108*a* indicating that the screen shows "Demographics" information, and a caption 108*b* indicating that the information is "Confirmed Guest Age" information in particular. The bar chart 108*c* illustrates ages of confirmed invitees. The bar chart 108*c* includes: a bar for invitees that are "<21", indicating that 4 of the 21 confirmed invitees (e.g., 19% of the confirmed invitees) are younger than 21; a bar for invitees that are "21-29", indicating that 5 of the 21 confirmed invitees (e.g., 24% of the confirmed invitees) are between 21 and 29 years old; a bar for invitees that are "30-39", indicating that 4 of the 21 confirmed invitees (e.g., 19% of the confirmed invitees) are between 30 and 39 years old; a bar for invitees that are "40-49", indicating that 2 of the 21 confirmed invitees (e.g., 10% of the confirmed invitees) are between 40 and 49 years old; and a bar for invitees that are ">49", indicating that 0 of the 21 confirmed invitees (e.g., 0% of the confirmed invitees) are older than 49. The bar chart 108*c* also includes a bar showing that 6 of the 21 confirmed invitees (e.g., 29%) do not have any age information associated with their user profile (e.g., these invitees have an "Undisclosed" age). The chart 108*c* therefore provides an event host with a quick and readily understandable visual indication of the ages of confirmed invitees.

FIG. 1E shows a screenshot 110 of a sample user interface showing the distributions of gender (e.g., "Male" or "Female"), relationship status (e.g., "Single" or "Non-Single"), and ages of confirmed invitees (e.g., using a parallel sets visualization). The user interface includes a caption 110*a* indicating that the screen shows "Demographics" information, and a caption 110*b* indicating that the information is "Confirmed Guest Distribution" information in particular. The chart 110*c* is a graphical visualization that illustrates genders, relationship statuses, and ages of confirmed invitees. The horizontal dimension bars in the chart 110*c* show the absolute frequency of how often each category occurred and the relative proportions of instances within each category. In this example, the top dimension bar shows the distribution between the "Male" and "Female" confirmed invitees. As discussed above, there are 14 male confirmed invitees (e.g., 67%) and 7 female confirmed invitees (e.g., 33%). The top line for male invitees is therefore twice as long as the female line. The middle dimension bar shows the distribution between the "Single" and "Non-Single" confirmed invitees. The chart indicates that 60% of the confirmed invitees are "Single" and 40% of the confirmed invitees are "Non-Single". The line for "Single" invitees is therefore proportionately longer than the "Non-Single" line. The bottom dimension bar shows the age distribution of confirmed invitees. As discussed above, 19% of the confirmed invitees are younger than 21, 24% of the confirmed invitees are between 21 and 29, 19% of the confirmed invitees are between 30 and 39, 10% of the confirmed invitees are between 40 and 49, and 29% of the confirmed invitees have an undisclosed age.

Between the dimension bars are ribbons that connect categories and show relative distributions. These ribbons illustrate how combinations of categories are distributed, and how a particular subset can be further subdivided. For example, the male invitees are represented with ribbons having a dash-dot line pattern, and the female invitees are represented with ribbons having a dash line pattern in FIG. 1E.

Advantageously, the ribbons may provide insights to the event host regarding relative distributions of confirmed invitees' characteristics along three dimensions. For example, the ribbons from the top dimension bar extending from the male line to the middle dimension bar indicate that a greater proportion of the confirmed male invitees are single than non-single. In particular, the ribbon extending from the "Male" line of the top dimension bar to the "Single" line of the middle dimension bar is wider than the ribbon extending from the "Male" line of the top dimension bar to the "Non-Single" line of the middle dimension bar. Likewise, the ribbons from the top dimension bar extending from the female line to the middle dimension bar indicate that a greater proportion of the confirmed female invitees are single than non-single. In particular, the ribbon extending from the "Female" line of the top dimension bar to the "Single" line of the middle dimension bar is wider than the ribbon extending from the "Female" line of the top dimension bar to the "Non-Single" line of the middle dimension bar.

The chart 110*c* also shows relative distributions of confirmed male and female invitees based on their relationship status. For example, the ribbons from the middle dimension bar extending from the single line to the bottom dimension bar indicate that all of the confirmed invitees who are under 21 are single males. In particular, the only ribbon extending to the "<21" line of the bottom dimension bar is from the portion of the "Single" line of the middle dimension bar that is under the "Male" ribbon. Also, the ribbons extending from the middle dimension bar to the "21-29" line of the bottom dimension bar indicate that all of the confirmed invitees between 21 and 29 are single, with more than half being male. The ribbons extending from the middle dimension bar to the "30-39" line of the bottom dimension bar indicate that all of the confirmed invitees between 30 and 39 are male, with more than half being non-single. And the ribbons extending from the middle dimension bar to the "40-49" line of the bottom dimension bar indicate that half of the confirmed invitees between 40 and 49 are non-single males, and half are non-single females.

FIG. 1F shows a screenshot 112 of a sample user interface showing an analysis of the interests of confirmed invitees. The user interface includes a caption 112*a* indicating that the screen shows "Demographics" information, and a caption 112*b* indicating that the information is "Confirmed Guest Interests" information in particular. As illustrated in FIG. 1F, a word cloud 112*c* represents interests of confirmed invitees. As discussed herein, a word cloud is a visual representation for textual data. Text in the word cloud may be terms (e.g., single words or short phrases), and the importance of each term may be shown with font size and/or color. Such a format may be useful for quickly perceiving the most prominent terms and for locating a term to determine its relative prominence. The word cloud 112*c* is populated with interests data from the user profiles of the invitees, which is obtained by a social intelligence service as described in more detail below.

The word cloud may be generated using any suitable technique. For example, the font size of a term in the word cloud 112*c* may be determined by its incidence. In particular, for a word cloud of interests, the font size of a term may correspond to the relative number of instances for that term in the user profiles of the current set of invitees (e.g., the confirmed invitees for this example). In some implementations, the font size may be specified directly using a predefined step size, from a minimum to a maximum font size. For example, a single occurrence of a term could cause the font size for that term to be the minimum size (e.g., 8 pt.), two occurrences could cause the font size to be the minimum plus one (e.g., 9 pt.), three occurrences could cause the font size to be the minimum plus two (e.g., 10 pt.). While a step size of one is described for example purposes, any suitable step size could be used, such as, for example, 2, 3, or 4. In other implementations, a scaling of font sizes may be made. For example, in a linear normalization, the weight $t_i$ of a term is mapped to a size scale of 1 through $f_{max}$, where $t_{min}$ and $t_{max}$ specify the range of available weights. Equation 1 below shows an example of such a scaling technique.

$$s_i = \left\lceil \frac{f_{max} \cdot (t_i - t_{min})}{t_{max} - t_{min}} \right\rceil \text{for } t_i > t_{min} \text{else } s_i = 1 \quad \text{(Eqn. 1)}$$

where $s_i$ is the display font size; $f_{max}$ is the maximum font size; $t_i$ is the number of instances of a given interest term in the user profiles of the current set of invitees; $t_{min}$ is the minimum number of times a term may occur (e.g., 1); and $t_{max}$ is the maximum number of times a term may occur.

The example word cloud 112*c* shows the relative frequency of interests associated with the user profiles of the confirmed invitees. Thus, the confirmed invitees collectively have a high interest in the "Georgia Tech Alumni Association," "Alert," and "Poogan's Porch" as indicated by these terms' relatively larger font. These terms may occur multiple times as interests in the user profiles of the confirmed invitees, whereas the remaining terms rendered in a smaller font may occur as an interest in only a single user profile of the confirmed invitees.

Although the analyses of different characteristics of invitees to an event illustrated and described above in connection with FIGS. 1C-1F relate to confirmed invitees of the event, the same analyses can be performed for the "Maybe" invitees, the "Declined" invitees, the "Awaiting" invitees, the "Total Invited" invitees, the "Currently Checked in" invitees, and/or the "Who Showed Up" invitees.

There are many different examples of electronic social networking platforms. Facebook, Twitter, LinkedIn, Google+, MySpace, and Orkut are just a few examples. But, there are many others, and it is reasonable to expect many more to be launched in the future. The techniques described herein for handling data available within an electronic social networking platform are widely applicable and may be applied to data available within any relevant electronic social networking platform.

Electronic social networking platforms frequently enable users to establish user profiles by registering and receiving a unique or otherwise identifying identifier from the platform. A user profile represents the user on the social networking platform, and may include a variety of information about the user. Such a user profile may include, among other information, information about the user's name, hometown, current residence, age, gender, relationship status, educational background, and/or professional background. Additionally or alternatively, the user profile may include records of various different interests of the user. In some implementations, the user profile may include information on membership in various groups. In some implementations, the user profile may include an electronic address (e.g., an email address or mobile phone number) that can be used to contact the user associated with the user profile.

Social networking platforms also permit users to establish connections with other users of the social networking platform (e.g., by linking user profiles to one another within the social networking platform). These connections between users may reflect relationships between the underlying human users who correspond to the user profiles. For example, a connection between two user profiles within an electronic social networking platform may reflect a social friendship (e.g., developed through physical interaction in the real-world and/or through on-line interaction in the cyberworld) or a professional relationship between the underlying human users who correspond to the user profiles.

In some electronic social networking platforms, a user profile may be able to unilaterally form a connection with another user profile. For example, an electronic social networking platform may enable a first user profile to form a connection to a second user profile simply by specifying a desire to form a connection to the second user profile and without requiring approval of the connection by the second user profile. Alternatively, in other electronic social networking platforms, the formation of connections between two user profiles may be a bilateral process. For example, in such electronic social networking platforms, when a first user profile specifies a desire to form a connection to a second user profile, the electronic social networking platform may establish the connection only after the second user profile approves the formation of the connection between the first user profile and the second user profile.

The connections formed between individual user profiles within an electronic social networking platform may be represented in the form of a graph, where user profiles are represented by nodes and connections between user profiles are represented by edges connecting the nodes. Such a graph of interconnected user profiles may change dynamically in time as new user profiles join and old user profiles quit the electronic social networking platform and/or as new connections are formed and old connections are dissolved. Proximity between two user profiles of an electronic social networking platform may be measured in terms of degrees of separation between the two user profiles. For example, proximity between two user profiles of an electronic social networking platform may be calculated as the fewest number of edges required to form a path between the two user profiles within the graph representing the connections between user profiles of the electronic social networking platform.

A user profile of an electronic social networking platform may form a social network within the electronic social networking platform by forming connections to other user profiles of the electronic social networking platform. In some cases, the social network of a particular user profile of an electronic social networking platform may be defined as the group of other user profiles to whom the particular user profile is directly connected. Alternatively, in other cases, the social network of a particular user profile of an electronic social networking platform may be defined to include a group of other user profiles that are within a threshold number of degrees of separation of the particular user profile within the graph.

In addition to enabling a user profile to establish connections to other user profiles and thereby form a social network, some electronic social networking platforms may enable a particular user profile to divide the user profile's social network into one or more subsets of user profiles who may, for example, share one or more characteristics of significance to the particular user profile. For example, a particular user profile of an electronic social networking platform may wish to define subsets of user profiles within the particular user profile's social network that reflect other user profiles with whom the particular user profile has a familial relationship, a professional relationship, a social relationship, and so forth. For ease of reference, such defined subsets of a particular user's social network may be referred to herein as "Friendlists."

Electronic social networking platforms commonly facilitate sharing of information and the exchange of electronic communications between user profiles and other user profiles who are part of their social networks. In some implementations, an electronic social networking platform may allow a particular user profile to access more detailed profile information about the other user profiles who are part of the particular user profile's social network than the electronic social networking platform allows the particular user profile to access about user profiles who are not part of the particular user profile's social network. For example, an electronic social networking platform may allow a particular user profile to access information about the hometowns and/or the current cities of residence of other user profiles who are part of the particular user profile's social network, but the electronic social networking platform may not allow the particular user profile to access this same information for user profiles who are not part of the particular user profile's social network.

Additionally or alternatively, an electronic social networking platform may provide communications conduits between a particular user profile and the other user profiles who are part of the particular user profile's social network that the electronic social networking platform does not otherwise provide between the particular user profile and other user profiles who are not part of the particular user profile's social network.

Some social networking platforms may enable user profiles to record endorsements of various different types of interests with the social networking platforms. Examples of such interests may include, among others, local businesses or places (e.g., restaurants, retail stores, parks, train or bus stations, airports, etc.); companies, organizations, or institutions; sports teams or clubs; brands or products; artists, bands, or public figures; forms of entertainment (e.g., books, music albums, movies, etc.); and causes or communities. Interests may be manifested within the electronic social networking platforms as so-called "pages." These pages may be maintained by one or more representatives of the interests or enterprises represented by the pages. In addition, among other features, these pages may provide information about the interests or enterprises the pages represent.

In some electronic social networking platforms, interests endorsed by a particular user profile may be shared with or otherwise made available to other user profiles of the electronic social networking platform. In particular, in some electronic social networking platforms, interests endorsed by a particular user profile may be shared with other user profiles who are members of the particular user profile's social network. For example, an electronic social networking platform may provide user profiles who are members of a particular user profile's social network with access to a detailed user profile page that includes, among other information, indications of interests that the particular user profile has endorsed within the electronic social networking platform.

Some electronic social networking platforms may also provide event management services. Among other features, these event management services often enable user profiles to generate events, invite other user profiles to attend such events, and manage guest lists for the events (e.g., manage RSVPs to the events from the invited user profiles indicating that the user profiles will be attending, will not be attending, tentatively will be attending, etc.).

In particular, some social networking platforms may enable user profiles to generate event objects within the electronic social networking platforms that represent events that they are hosting. After creating event objects for such events, user profiles may be provided with mechanisms for inviting other user profiles to the events. Furthermore, a connection may be established between an event object and a user profile within an electronic social networking platform as a result of the user profile being invited to the event and/or as a result of the user profile registering with the electronic social networking platform that the user profile will be attending the event. Such a connection between a user profile object and an event object may be referred to herein as "event" connections.

There may be various different types of event connections between user profiles and event objects in a social networking platform. For example, one type of an event connection between a user profile and an event object in a social networking platform may signify that the user profile is the host of the event. Another type of an event connection between a user profile and an event object in a social networking platform may signify that the user profile has been invited to the event. Still another type of event connection between a user profile and an event object in a social networking platform may signify that the user profile has registered with the electronic social networking platform that the user profile will be attending the event. Yet another type of event connection between a user profile and an event object in a social networking platform may signify that the user profile has registered with the electronic social networking platform that the user profile will not be attending the event. Still one more type of event connection between a user profile and an event object in a social networking platform may signify that the user profile has registered with the electronic social networking platform that the user profile tentatively will be attending the event.

In some social networking platforms, an event object also may be manifested as an "event page" that provides information about the event the object represents (e.g., date, time, and location information for the event), and the electronic social networking platform may enable one or more designated representatives associated with the event (e.g., the hosts) to share information and exchange electronic communications with user profiles who have been invited to the event via the "event page."

Furthermore, some social networking platforms may enable users to establish connections with independent applications that leverage the social networking platforms, for example, by granting the independent applications authorization to access, extract, and/or create data on the electronic social networking platform on their behalf. Social networking platforms also may provide an application programming interface (API) that enables the independent applications to interact with and extract data from the electronic social networking platform. These APIs may be, for example, web services (e.g., Representational State Transfer (REST) or Simple Object Access Protocol (SOAP) services) operated by the social networking platform.

As an example of an independent application, a social intelligence service that is external to an electronic social networking platform may extract content from the electronic social networking platform that is available to different user profiles of the electronic social networking platform. Thereafter, the social intelligence service may process the extracted content and represent the extracted content and/or generate reports about the extracted content so as to enable the individual user profiles to glean better intelligence from the large volume of content that is available to them within the electronic social networking platform.

For example, a social intelligence service may extract information that is relevant to a user planning to host an event (e.g., genders, ages, relationship statuses, interests, hometowns, current residences, and/or membership in groups of other user profiles who are members of the particular user profile's social network), and represent the extracted information and/or generate reports about the extracted information so as to enable the event host to glean better insights regarding who should be invited.

Additionally or alternatively, a social intelligence service may extract event information that is relevant to a particular user of an electronic social networking platform (e.g., information about events to which the user profile has received invitations through the electronic social networking platform and information about events to which members of the user profile's social network have received invitations through the electronic social networking platform), and represent the extracted event information and/or generate reports about the extracted event information so as to enable the particular user profile to glean better intelligence about the event information than the particular user profile otherwise may be able to do within the electronic social networking platform.

A social intelligence service also may extract endorsement information that is relevant to a particular user profile of an electronic social networking platform (e.g., information about interests endorsed by other user profiles who are members of the particular user profile's social network), and represent the extracted endorsement information and/or generate reports about the extracted endorsement information so as to enable the particular user profile to glean better intelligence about the endorsement information than the particular user profile otherwise may be able to do within the electronic social networking platform.

As another example of an independent application, an event management service that is external to an electronic social networking platform may create and manage events (e.g., event objects) on behalf of event hosts who are users of the electronic social networking platform. These events can be connected to different user profiles that are within the social network of the event host on the electronic social networking platform. Thereafter, the event management service may write event data back to the generated events.

For example, a host of an event can access an event management service via, for example, a mobile application on a client device. To create an event, the event host can enter various information about the event, such as, for example, an event name, one or more photos associated with the event, a date and time of the event, a location of the event, a description of the event, and/or one or more invitees to the event. The event host may select from among various privacy setting for the event. Once the event information has been entered, the event management service can access an API for the social networking platform to create a corresponding event object.

Subsequently, as described above with reference to FIG. 1A, the event host can view information about invitees through the mobile application. In particular, the mobile application can retrieve information about the created event object from the event management service, which retrieves the information via an API for the social networking platform. The retrieved information can be, for example, information on the status of invitees (e.g., confirmed, maybe, declined, awaiting, and total invited).

In addition, as described above with reference to FIGS. 1C to 1F, the event host can analyze characteristics of the invitees to the event with the mobile application. In particular, the mobile application may obtain information from the user profiles of invitees via the social intelligence service, which accesses the API of the social networking platform, for example, to retrieve user profiles of invitees to the event.

The different examples of electronic social networking platforms described above may provide various different types of user interfaces for interacting with the electronic social networking platforms. In one particular example, an electronic social networking platform may provide multiple different user interfaces to users to enable the users to interact with the underlying electronic social networking platform.

Figure 2:
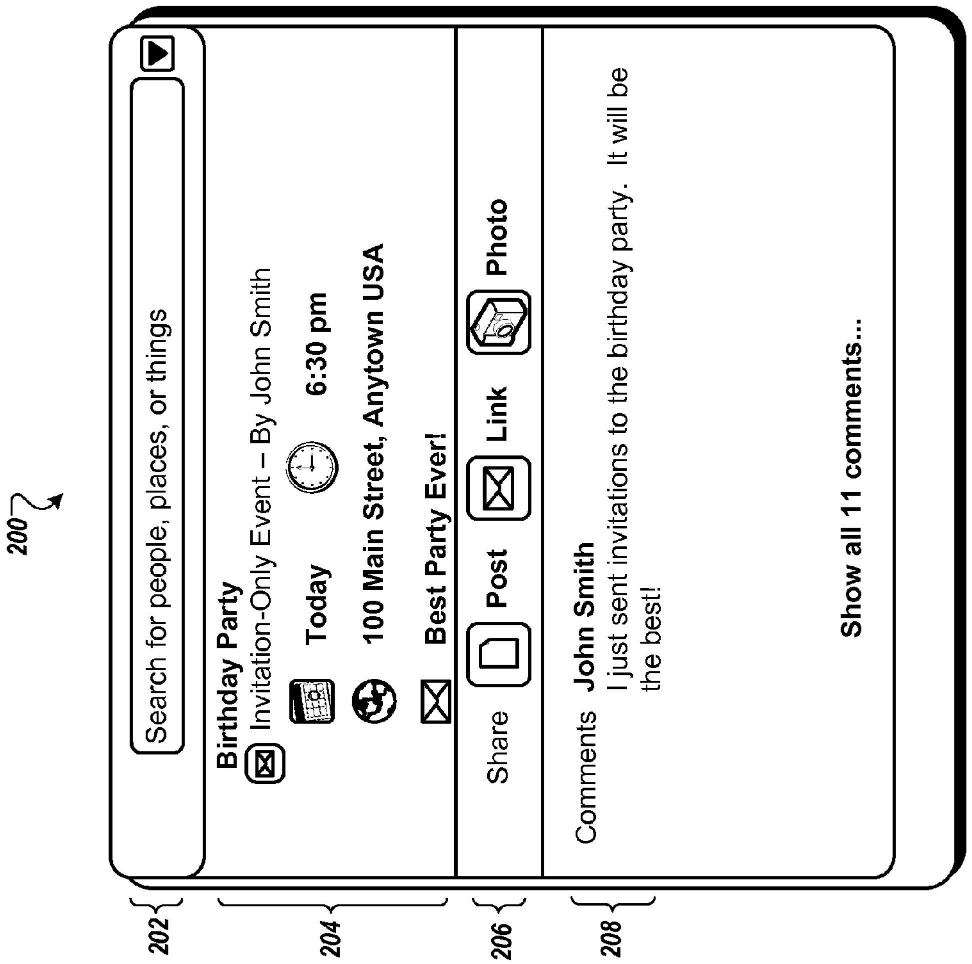
FIG. 2 is a sample screenshot of an event on an example of a social networking platform.

FIG. 2 shows a sample screen shot 200 of an event page for a social networking platform that may be displayed to an invitee to the event. In particular, an event displayed by the social networking platform could include a search box 202, an event details box 204, social networking tools 206, and a comments portion 208. The search box 202 can provide the invitee the capability to search for people, places, or things on the social networking platform. The event details box 204 shows specific details about the event, such as the name of the event (e.g., birthday party), the type of event (e.g., invitation-only event by John Smith), the date and time of the event (e.g., today at 6:30 PM), the location of the event (e.g., 100 Main St., Anytown, USA), and a description of the event (e.g., "Best party ever!"). The social networking tools 206 may include options for the invitee to post a comment about the event, to include information about the event as an attachment to a message (e.g., an email), and/or to upload pictures or photographs associated with the event. The comments portion 208 may include comments posted by the event hosts and/or invitees to the event. For example, the event host John Smith has posted a comment stating: "I just sent invitations to the birthday party. It will be the best!"

Figure 3:
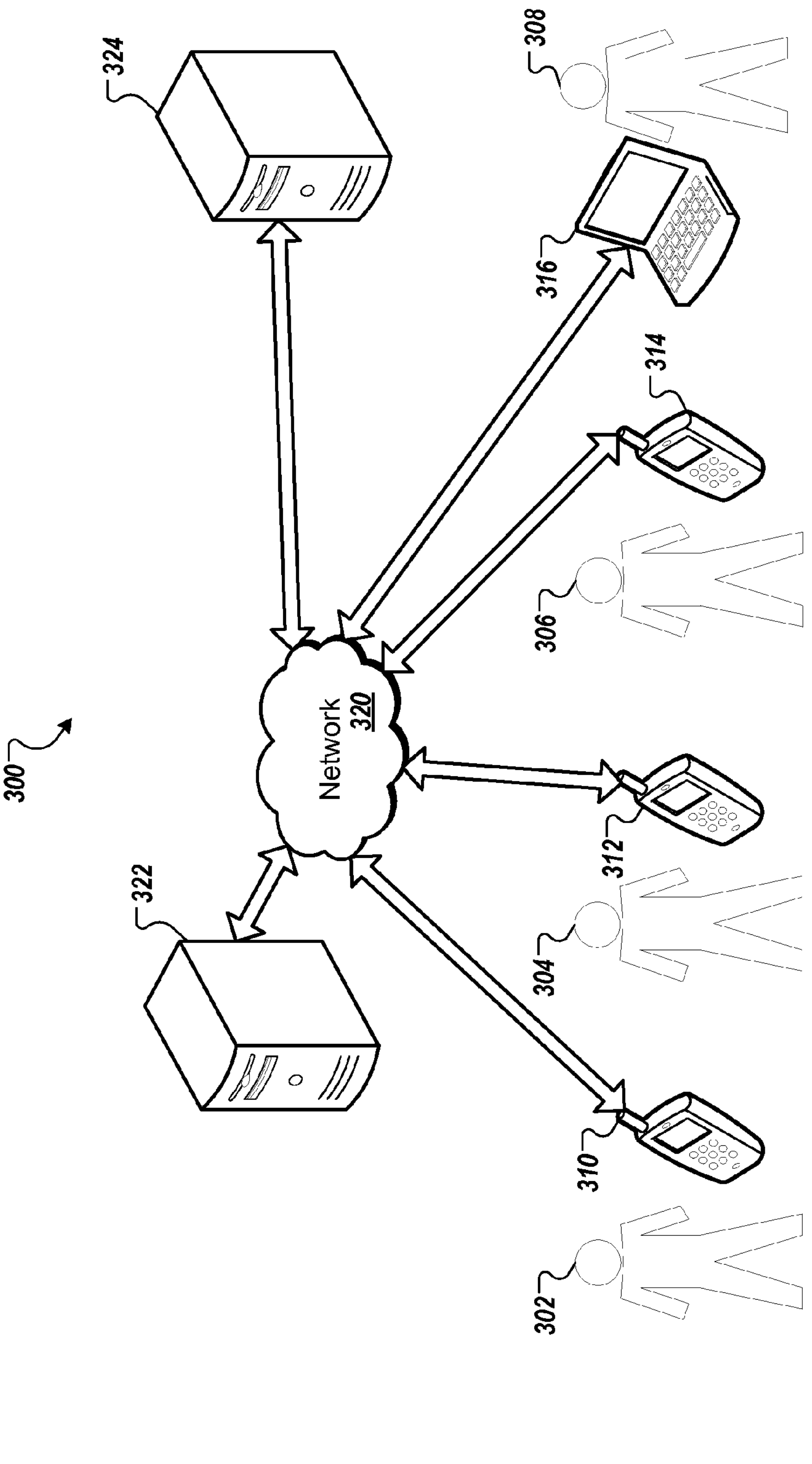
FIG. 3 is a diagram of an example of a system for analyzing user profiles of invitees to an event.

FIG. 3 shows a sample system 300 for analyzing user profiles of invitees to an event. As an overview, a host of an event 302 may access a mobile application executing on a client device 310 to view and analyze characteristics of invitees to an event. The client device 310 may access a social intelligence service and an event management service operating on a server 322 via a network 320. In addition, the server 322 may access a social networking platform 324 via the network 320.

Initially, in response to receiving a command from the event host 302 via the client device 310 to view invitees to an event, the event management service executing on the server 322 retrieves an event object (e.g., corresponding to a particular event identified by the event host 302). In particular, the event management service may access an API of the social networking platform, retrieve the desired information, and then transmit the information to the client device 310. The event host 302 can then view the retrieved information about invitees through the mobile application. The retrieved information can be, for example, information on the status of invitees to the event (e.g., confirmed, maybe, declined, awaiting, and total invited).

Subsequently, in response to receiving a command from the event host 302 via the client device 310 to analyze the invitees or some subset of the invitees to an event (e.g., confirmed, maybe, declined, awaiting, and total invited), the event management service executing on the server 322 obtains characteristics (e.g., gender, age, relationship status, interests, current residence, etc.) of the user profiles in the subset. For example, the social intelligence service may access an API of the social networking platform, retrieve the desired characteristics of the user profiles corresponding to the invitees, and then transmit the characteristics to the client device 310. The event host 302 can then view and analyze the retrieved characteristics of the invitees through the mobile application as described above with reference to FIGS. 1C to 1F.

In some implementations, the event host 302 may also initiate transmission of invitations to the invitees. For example, the event host 302 may send a command to send invitations to the event management service executing on the server 322. In response, the event management service may generate communications (e.g., invitations) to the client devices 312, 314, 316, of the users 304, 306, 308, respectively, whom the event host instructed the event management service to send invitations. In some implementations, the invitations may be sent from the social networking platform 324 at the direction of the event management service 322. In other implementations, the invitations may be sent directly from the event management service 322.

The client device 310 operated by the event host 302, and the client devices 312, 314, 316 operated by users 304, 306, 308 respectively, may be any type of computing devices capable of communicating with the server 322 via the network 320, including but not limited to mobile phones, smart phones, PDAs, music players, e-book readers, tablet computers, laptops or desktop computers, or other stationary or portable devices, that include one or more processors and non-transitory computer readable storage media. Applications (e.g., mobile applications) executing on the client devices 310, 312, 314, 316 provide an interface through which the event host 302, and users 304, 306, 308 can select invitees and analyze characteristics of the selected invitees. In some implementations, the mobile applications may also provide the capability to create, manage, and/or view invitations to an event. The mobile applications can be written in any suitable programming language such as, for example, Objective-C, C++, Java, etc. running on any suitable operating system, e.g., Windows 8, iOS, or Android.

The server 322 may be implemented using one or more computing devices (e.g., servers). The one or more computing devices on which server 322 is implemented may have internal or external storage components storing data and programs such as an operating system and one or more application programs. The one or more application programs may be implemented as instructions that are stored in the storage components and that, when executed, cause the one or more computing devices to provide the features ascribed herein to the server 322. Furthermore, the one or more computing devices on which server 322 is implemented each may include one or more processors for executing instructions stored in storage and/or received from one or more other electronic devices, for example, over network 320. In addition, these computing devices also typically may include network interfaces and communication devices for sending and receiving data.

The server 322 may host an event management service. As such, server 322 may be configured to create, manage, and retrieve event data from one or more electronic social networking platforms (e.g., electronic social networking platform 324). For example, server 322 may be configured to access an API to obtain event objects from the electronic social networking platform 324 at the request of the event host 302.

In some implementations, the event management service may also provide the capability for the event host 302 to track attendance status of invitees to the event. Such tracking may utilize "check-in" and "check-out" functionality. In some implementations, an invitee 304, 306, 308 may "check-in" and/or "check-out" of an event, using a mobile device-based invitation for the event.

Figure 4:
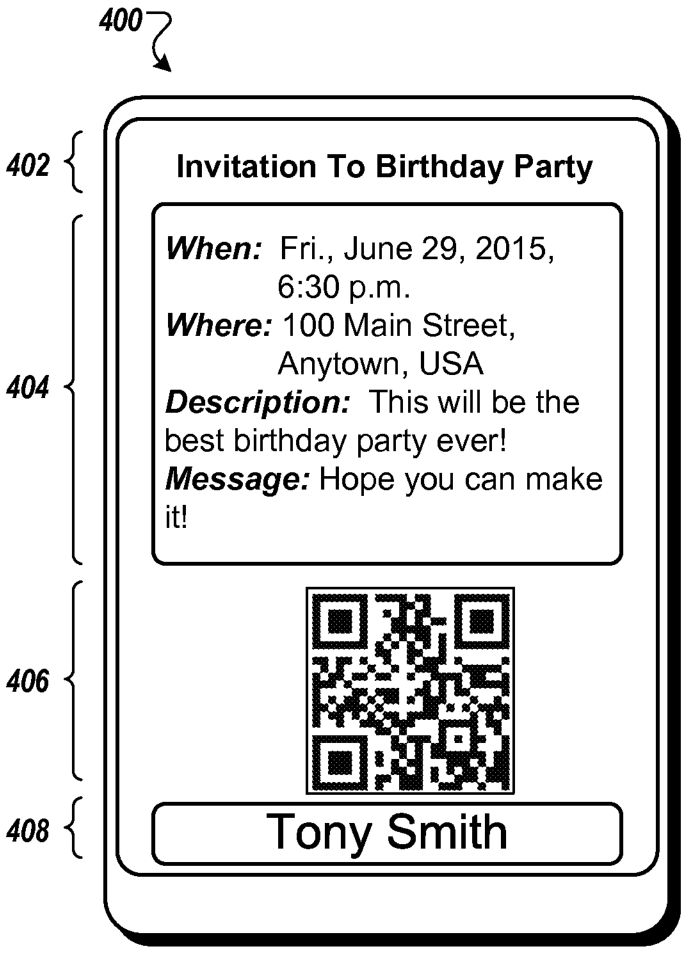
FIG. 4 is a sample screenshot of an example of an invitation to an event.

For example, an invitee 304, 306, 308 may "check-in" and/or "check-out" of an event by presenting an optical machine-readable representation of an invitation to the event (e.g., a quick response (QR) code) displayed on the invitee's mobile device for scanning to an appropriate scanning device. FIG. 4 shows a screenshot 400 of an example of one such invitation to an event. The invitation includes a caption 402 showing the title of the invitation and an invitation details box 404 describing specific details of the event. In particular, the details box 404 shows the date and time of the event (e.g., Friday, Jun. 29, 2012, 6:30 PM), the event location (e.g., 100 Main St., Anytown, USA), a description of the event (e.g., "This will be the best birthday party ever!"), and a message sent by the event host (e.g., "Hope you can make it!"). The invitation also includes the name of the invitee 408 (e.g., Tony Smith). Additionally, as described in greater detail below, the invitation may include a representation of the invitation 406 that can be validated by an authority involved in regulating attendance at the event (e.g., a door manager) to authorize the invitee to enter the event. For example, the representation of the invitation 406 may be a QR code. When the client device of the invitee displays the QR code, the authority involved in regulating attendance to the event can operate a processing system to scan the QR code from the display of the client device. The processing system can then validate the invitation by communicating information decoded from the QR code (e.g. an invitation identifier and an invitee identifier) to a server, and receiving a response indicating whether the invitation is valid.

Additionally or alternatively, an invitee 304, 306, 308 may "check-in" and/or "check-out" of an event by providing a phrase code corresponding to the event communicated to the invitee's mobile device to an authority involved in regulating attendance to the event, by providing an alphanumeric code corresponding to the event communicated to the invitee's mobile device to the authority involved in regulating attendance to the event, by using the invitee's mobile device to access a representation of an invitation to the event within a predetermined distance of the event, etc. An invitee 304, 306, 308 also may manually "check-in" and/or "check-out" of the event.

The event management service may track the attendance status of the invitees 304, 306, 308, for example, by updating a table stored at the server 322, or accessible to the server 322, with the status of the invitee 304, 306, 308 for the event. When an invitee is currently "checked-in" to an event, the corresponding user profile will be included in the subset of user profiles retrieved when the event host 302 selects the "Currently Checked In" command button 102*h* as described above in reference to FIG. 1A. When an invitee "checks-in," the server 322 may also update a table to indicate that the invitee has attended the event. Subsequently, the corresponding user profile will be included in the subset of user profiles retrieved when the event host 302 selects the "Who Showed Up" command button 102*i* as described above in reference to FIG. 1A.

In more detail, an invitee 304, 306, 308 may "check in" and/or "check-out" of an event by providing a phrase code corresponding to the event to an authority involved in regulating access to the event. As referred to herein, a phrase code may be a sequence of two or more words selected from one or more dictionaries of words that need not form a grammatical construct. A dictionary as used herein is a data structure in which index values identify words. A given dictionary may include many thousands of different words. In operation, applications for phrase code validation executing on the client device 312, 314, 316 and a processing system of the authority involved in regulating attendance to the event can access a common set of dictionaries for generating phrases, so that when the applications reference the same index values in the same dictionaries, at substantially the same time, they can select the same phrases. Thus, the processing system of the authority involved in regulating attendance to the event displays the same phrase as the client devices 312, 314, 316, which enables the authority involved in regulating access to the event to validate the phrases at the client device 312, 314, 316. When the authority involved in regulating attendance to the event validates a phrase presented by an invitee, the processing system of the authority can notify the server 322 that the invitee is "checked-in" to the event. If the invitee is already "checked-in," then the server 322 can update the invitee's status to "checked-out."

An invitee 304, 306, 308 may also "check-in" and/or "check-out" of an event using an optical machine-readable representation of an invitation to the event. As referred to herein, an optical machine-readable representation may be an arrangement of graphical elements that encode alphanumeric data, where the elements are arranged so that the data can be read by an optical scanner. For example, an optical machine-readable representation may be a bar code or a quick response code (QR code). In some implementations, the optical machine-readable representations may encode credential identifiers and user identifiers. In other implementations, the optical machine-readable representations may encode other identifiers that are linked to or otherwise associated with credential identifiers and/or user identifiers. In operation, the client device 312, 314, 316 may receive optical machine-readable representations of invitations to the event from the server 322, and/or may generate optical machine-readable representations of invitations to the event given credential identifiers and user identifiers. The client device 312, 314, 316 can then output optical machine-readable representations of invitations to the display of the client devices 312, 314, 316. An authority involved in regulating attendance to the event can operate a processing system to scan the optical machine-readable representations from the displays of the client devices 312, 314, 316. The processing system can then validate the invitations by communicating information decoded from the optical machine-readable representations (e.g. a credential identifier and a user identifier) to the server 322, and receiving responses indicating whether the invitations are valid. When an invitee's optical machine-readable representation of an invitation is validated, the server 322 may record the invitee as being "checked-in" to the event if the invitee has not already "checked-in" to the event. Alternatively, if the invitee already is "checked-in," the server 322 may update the invitee's status to "checked-out" responsive to a successful validation of the invitee's optical machine-readable representation of the invitation.

An invitee 304, 306, 308 may also "check-in" and/or "check-out" of an event by providing an alphanumeric representation of an invitation to the event. As referred to herein, an alphanumeric representation may be a sequence of letters and/or numbers that is associated with an event and, in some implementations, a particular invitee. In some instances, a given alphanumeric representation will only be valid for a certain time period. In operation, applications for alphanumeric code validation execute on the client device 312, 314, 316 and the processing system of the authority involved in regulating attendance to the event. The server 322 associates an alphanumeric representation of an invitation with an invitee 304, 306, 308 and an event, and distributes the alphanumeric representation to the invitee's client device 312, 314, 316. When the invitee 304, 306, 308 presents an alphanumeric representation (e.g., a stored numeric representation from the server 322) to the authority involved in regulating attendance to the event, for example by making an utterance including the alphanumeric value or displaying the alphanumeric value rendered on the invitee's client device 312, 314, 316, the processing system associated with the authority can validate the alphanumeric value by communicating the alphanumeric value to the server 322, and receiving a response indicating whether the alphanumeric value matches a valid alphanumeric representation for the invitation (e.g., an alphanumeric representation for the invitation that currently is associated with an invitee to the event at the point in time the processing system communicates the alphanumeric value to the server 322). When the credential authority validates a numeric representation for a credential presented by an invitee, the processing system of the credential authority can notify the server 322 that the invitee is "checked-in" to the event. If the invitee is already "checked-in," then the server 322 can update the invitee's status to "checked-out." When an invitee's alphanumeric representation of an invitation is validated, the server 322 may record the invitee as being "checked-in" to the event if the invitee has not already "checked-in" to the event. Alternatively, if the invitee already is "checked-in," the server 322 may update the invitee's status to "checked-out" responsive to a successful validation of the invitee's alphanumeric representation of the invitation.

An invitee 304, 306, 308 may also "check-in" to an event by accessing a representation for an invitation to the event on the invitee's client device 312, 314, 316 within a certain predetermined distance (and optionally time) associated with the event. For example, when the invitee 304, 306, 308 operates a mobile application executing on the client device 312, 314, 316 to display the representation of the invitation to an authority involved in regulating attendance to the event, the client device 312, 314, 316 determines the current location of the client device 312, 314, 316. If the client device 312, 314, 316 determines that the current location of the client device 312, 314, 316 is within a predefined distance of the location associated with the event, the client device 312, 314, 316 infers that the invitee 304, 306, 308 associated with the credential for which the representation was displayed has entered the event and notifies the server 322 via the network 320 that the invitee 304, 306, 308 has entered the event. Similarly, the invitee 304, 306, 308 may be "check-out" of an event responsive to detecting that the invitee's mobile device 312, 314, 316 has travelled a predetermined distance from the event after the invitee "checked-in" to the event.

The server 322 may also host a social intelligence service. As such, server 322 may be configured to extract and process data from one or more electronic social networking platforms (e.g., electronic social networking platform 324) at the request of an event host 302. For example, server 322 may be configured to access an API to extract data from electronic social networking platform 324. Among other features, server 322 may extract data from the user profiles of invitees to an event, including, for example, demographic information (e.g., gender, age, relationship status, interests, current residence), and/or information about interests of the invitees. In some implementations, the social intelligence service and the event management service may be separate applications that cooperate with one another to enable, e.g., targeted invitations. In other implementations, the social intelligence service and the event management service may be a single, unified application.

The server 322 may then aggregate the extracted data and transmit the aggregate data to a client device 310 of an event host 302 upon request. In some implementations, the server 322 may exclude user profiles from the aggregate data where the user profiles have undeclared/undisclosed values for one or more desired characteristics. For example, if the client device 310 requests aggregate data regarding gender information of invitees' user profiles, the server 322 may exclude user profiles from the aggregate data that have undisclosed gender information.

Electronic social networking platform 324 may be implemented using one or more computing devices (e.g., servers) configured to provide a service to one or more client devices connected to electronic social networking platform 324 over network 320. In some implementations, the system 300 may include multiple electronic social networking platforms. The one or more computing devices on which electronic social networking platform 324 is implemented may have internal or external storage components storing data and programs such as an operating system and one or more application programs. The one or more application programs may be implemented as instructions that are stored in the storage components and that, when executed, cause the one or more computing devices to provide the features of an electronic social networking platform 324. Furthermore, the one or more computing devices on which electronic social networking platform 324 is implemented each may include one or more processors for executing instructions stored in storage and/or received from one or more other electronic devices, for example over network 320. In addition, these computing devices also typically may include network interfaces and communication devices for sending and receiving data. Electronic social networking platform 324 also may provide an API that enables other applications to interact with and extract data from the electronic social networking platform 324.

In some implementations, electronic social networking platform 324 may enable individual user profiles (e.g., the event host 302 and/or users 304, 306, 308) to grant server 322 a token that defines permission levels related to data about the user profiles' social network that server 322 may access and extract from electronic social networking platform 324. For each individual user profile for which server 322 has a token, server 322 may extract information about the user profile and the other user profiles who are members of the user profile's social network. This information may include identifying information for the user profile and each member of the user profile's social network as well as demographic information for the user profile and each member of the user profile's social network (e.g., hometown, current residence, age (or date of birth), gender, relationship status, etc.). For each individual user profile for which server 322 has a token, server 322 also may extract communications that have been shared with the user profile, information about interests the user profile has identified, and/or information about events to which the user profile has been invited.

In some implementations, after retrieving information about an event or extracting user data from electronic social networking platform 324, the server 322 may store the associated data in one more databases. For example, the server 322 may store information in one or more on-line transaction processing (OLTP) databases. Such OLTP databases may be implemented as relational or other forms of databases. Server 322 then may process the data stored in the database(s) and load the processed data into a data warehouse (e.g., an on-line analytical processing (OLAP) data warehouse) that may facilitate reporting and analysis of the processed data. Server 322 then may provide an event host with access to data that corresponds to data extracted from electronic social networking platform 324 that is related to invitees to an event hosted by the event host.

For example, a mobile application on the client device 310 may provide the event host 302 the capability to access the social intelligence service operating on the server 322 to analyze user profiles of invitees to an event hosted by the event host 302. The mobile application may allow the event host to analyze various characteristics of invitees to the event, such as, for example, one or more of gender, age, relationship status, current residence, interests, Friendlists, and so forth.

Figure 5:
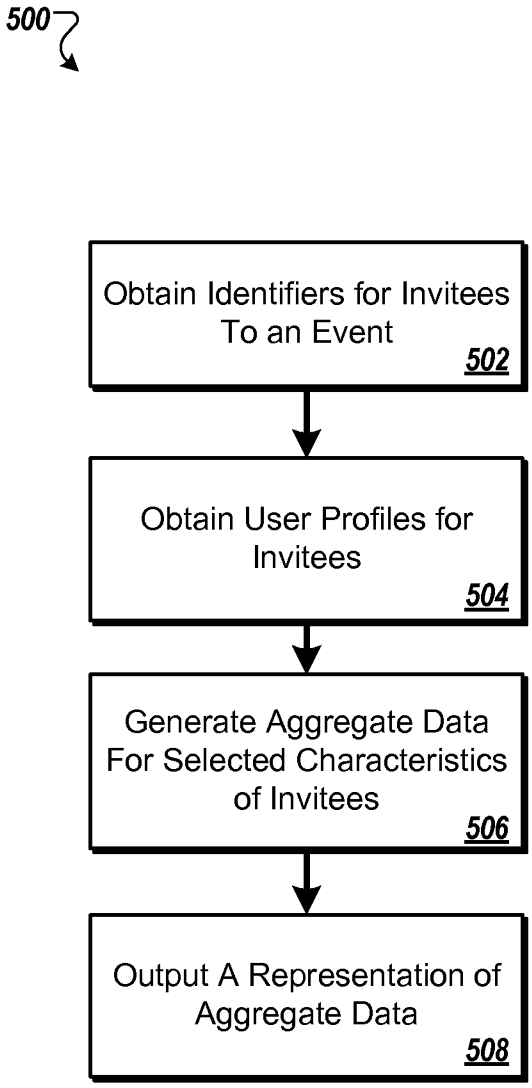
FIG. 5 is a flowchart of an example of a process for an application for analyzing user profiles of invitees to an event.

FIG. 5 shows an example process 500 for an application (e.g., a mobile application) for analyzing user profiles of invitees to an event. The steps described below may be performed by a processor that is part of a server or a processor that is part of a client device; or performance of the steps described below may be divided among any suitable combination of a server and/or a client device. A client device may be operated by the event host and/or the invitees to the event. For example, in addition to the event host being able to analyze characteristics of the invitees to the event, one or more of the invitees also may be able to analyze the characteristics of the invitees to the event.

In step 502, the processor obtains a plurality of identifiers, where each of the identifiers corresponds to an invitee to an event. The plurality of identifiers may correspond to all or a selected subset of invitees to the event, for example, all of the invitees who have accepted invitations to the event, all of the invitees who have tentatively accepted invitations to the event, all of the invitees who have declined invitations to the event, all of the invitees who have not responded to invitations to the event, all of the invitees who attended the event, and/or all of the invitees who are currently attending the event. For example, the server 322 may retrieve identifiers associated with invitees by obtaining an event object associated with a specified event from the social networking platform 324. Alternatively or in addition, the client device 310 may retrieve identifiers by communicating with the server 322 and/or the social networking platform 324.

Then, in step 504, the processor obtains a user profile (or other user data) for each of the plurality of identifiers. Such user profiles (or other user data) typically include a value for each of a plurality of characteristics (e.g., gender, age, relationship status, interests, and/or current residence) of the users to which they correspond. In some instances, the value for one or more of such characteristics may be undeclared/undisclosed (e.g., not available in the user profile or other user data). For example, the server 322 may retrieve user profiles or other user data associated with the invitees to the event by accessing an API of the social networking platform 324 and/or by retrieving the user profiles or other user data from a database or other form of storage accessible to the server 322 where user profiles or other user data previously extracted from social networking platform 324 are stored. Alternatively or in addition, the client device 310 may retrieve user profiles or other user data by communicating with the server 322 and/or the social networking platform 324.

Next, in step 506, the processor generates aggregate data representing the values from the user profiles or other user data for one or more selected characteristics. In some implementations, the processor may exclude user profiles associated with undeclared values for one or more of the selected characteristics. For example, if a given user profile lacks a gender characteristic, that user profile may be excluded from the aggregate data when the server is compiling aggregate data on gender characteristics. In some implementations, the server 322 generates the aggregate data. Alternatively or in addition, the client device 310 generates the aggregate data.

Finally, in step 508, the processor outputs a representation of the aggregate data for display on a client device. The representation of the aggregate data may be, for example, a bar chart, a word cloud, a histogram, or any other suitable visualization of the aggregate data. In some implementations, the client device 310 may generate the representation and render the representation on a display of the client device. In some implementations, the server 322 may generate and transmit a representation of the aggregate data to the client device 310 for rendering on a display.

Some implementations enable the event host to create an event (e.g., on the social networking platform). For example, the client device may receive event details from the event host including an event time, an event location, an event description, and an event picture. In response, the client device may initiate transmission of the event details to addresses of invitees.

In some implementations, the client device may initiate transmission of a credential associated with the event (e.g., a representation of an invitation to the event) to the invitees. The transmission may be sent via a server, email, SMS, or the electronic social networking platform. Also, some implementations include an RSVP capability that enables invitees to indicate to the event host that they intend to attend the event.

Some implementations allow the event host to transmit a message to the invitees. In some aspects, the message may be included with a transmitted invitation.

While described above as being external to the social networking platform 324, the event management service and social intelligence service may be an event management system integral with a social networking platform that includes independent access to user profiles that include user information regarding gender, age, relationship status, interests, current location, and Friendlists. Additionally, in some implementations, the event host 302 may be able to invite users who are not in the social network of the event host 302.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a touchscreen and/or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as a network described above. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

The invention claimed is:

1. A non-transitory computer-readable medium storing instructions executable by one or more computers that, upon execution, cause the one or more computers to perform operations comprising:

obtaining, at a processor, a plurality of identifiers, each identifier corresponding to an invitee to an event;

obtaining, at the processor, a user profile for each of the plurality of identifiers, wherein each user profile comprises a value for each of a plurality of characteristics;

obtaining, at the processor, aggregate data representing the values associated with the plurality of user profiles of the invitees for one or more selected characteristics;

generating, at the processor, a graphical representation of the aggregate data for the values associated with the plurality of user profiles of the invitees for each of the one or more selected characteristics; and outputting, for display on a client device, the graphical representation of the aggregate data.

2. The computer-readable medium of claim 1, wherein obtaining, at a processor, a plurality of identifiers, each identifier corresponding to an invitee to an event comprises obtaining, at a processor, a plurality of identifiers, each identifier corresponding to an invitee to an event, wherein the plurality of identifiers comprises identifiers for all of the invitees to the event; and wherein obtaining, at the processor, a user profile for each of the plurality of identifiers, wherein each user profile comprises a value for each of a plurality of characteristics comprises obtaining, at the processor, a user profile for all of the invitees to the event, wherein each user profile comprises a value for each of a plurality of characteristics.

3. The computer-readable medium of claim 1, wherein obtaining, at a processor, a plurality of identifiers, each identifier corresponding to an invitee to an event comprises obtaining, at a processor, a plurality of identifiers, each identifier corresponding to an invitee to an event, wherein the plurality of identifiers comprises identifiers for all of the invitees who have accepted invitations to the event; and wherein obtaining, at the processor, a user profile for each of the plurality of identifiers, wherein each user profile comprises a value for each of a plurality of characteristics comprises obtaining, at the processor, a user profile for all of the invitees who have accepted invitations to the event, wherein each user profile comprises a value for each of a plurality of characteristics.

4. The computer-readable medium of claim 1, wherein obtaining, at a processor, a plurality of identifiers, each identifier corresponding to an invitee to an event comprises obtaining, at a processor, a plurality of identifiers, each identifier corresponding to an invitee to an event, wherein the plurality of identifiers comprises identifiers for all of the invitees who have tentatively accepted invitations to the event; and wherein obtaining, at the processor, a user profile for each invitee to the event, wherein each user profile comprises a value for each of a plurality of characteristics comprises obtaining, at the processor, a user profile for all of the invitees who have tentatively accepted invitations to the event, wherein each user profile comprises a value for each of a plurality of characteristics.

5. The computer-readable medium of claim 1, wherein obtaining, at a processor, a plurality of identifiers, each identifier corresponding to an invitee to an event comprises obtaining, at a processor, a plurality of identifiers, each identifier corresponding to an invitee to an event, wherein the plurality of identifiers comprises identifiers for all of the invitees who have declined invitations to the event; and wherein obtaining, at the processor, a user profile for each of the plurality of identifiers, wherein each user profile comprises a value for each of a plurality of characteristics comprises obtaining, at the processor, a user profile for all of the invitees who have declined invitations to the event, wherein each user profile comprises a value for each of a plurality of characteristics.

6. The computer-readable medium of claim 1, wherein obtaining, at a processor, a plurality of identifiers, each identifier corresponding to an invitee to an event comprises obtaining, at a processor, a plurality of identifiers, each identifier corresponding to an invitee to an event, wherein the plurality of identifiers comprises identifiers for all of the invitees who have not responded to invitations to the event; and wherein obtaining, at the processor, a user profile for each of the plurality of identifiers, wherein each user profile comprises a value for each of a plurality of characteristics comprises obtaining, at the processor, a user profile for all of the invitees who have not responded to invitations to the event, wherein each user profile comprises a value for each of a plurality of characteristics.

7. The computer-readable medium of claim 1, wherein obtaining, at a processor, a plurality of identifiers, each identifier corresponding to an invitee to an event comprises obtaining, at a processor, a plurality of identifiers, each identifier corresponding to an invitee to an event, wherein the plurality of identifiers comprises identifiers for all of the invitees who attended the event; and wherein obtaining, at the processor, a user profile for each of the plurality of identifiers, wherein each user profile comprises a value for each of a plurality of characteristics comprises obtaining, at the processor, a user profile for all of the invitees who attended the event, wherein each user profile comprises a value for each of a plurality of characteristics.

8. The computer-readable medium of claim 1, wherein obtaining, at a processor, a plurality of identifiers, each identifier corresponding to an invitee to an event comprises obtaining, at a processor, a plurality of identifiers, each identifier corresponding to an invitee to an event, wherein the plurality of identifiers comprises identifiers for all of the invitees who are currently attending the event; and wherein obtaining, at the processor, a user profile for each of the plurality of identifiers, wherein each user profile comprises a value for each of a plurality of characteristics comprises obtaining, at the processor, a user profile for all of the invitees who are currently attending the event, wherein each user profile comprises a value for each of a plurality of characteristics.

9. The computer-readable medium of claim 1, wherein obtaining, at the processor, aggregate data representing the values associated with the plurality of user profiles of the invitees for one or more selected characteristics comprises obtaining, at the processor, aggregate data representing the values associated with the plurality of user profiles for at least one of an age, a gender, a relationship status, or a set of interests.

10. The computer-readable medium of claim 1, wherein obtaining, at the processor, a user profile for each of the plurality of identifiers, wherein each user profile comprises a value for each of a plurality of characteristics, comprises obtaining, at the processor from an electronic social networking platform, a user profile for each invitee to the event, wherein each user profile comprises a value for each of a plurality of characteristics.

11. The computer-readable medium of claim 1, wherein at least one value for one or more of the plurality of characteristics for one or more of the user profiles is undeclared, and wherein obtaining, at the processor, aggregate data representing the values associated with the plurality of user profiles of the invitees for one or more selected characteristics comprises excluding user profiles associated with undeclared values for the one or more selected characteristics.

12. The computer-readable medium of claim 1, wherein outputting, for display on a client device, the graphical representation of the aggregate data comprises rendering, on a display of a client device associated with a host of the event, the graphical representation of the aggregate data.

13. The computer-readable medium of claim 1, wherein outputting, for display on a client device, the graphical representation of the aggregate data comprises transmitting, to a client device associated with a host of the event, the graphical representation of the aggregate data for rendering on a display of the client device.

14. A computer-implemented method comprising:

obtaining, at a processor, a plurality of identifiers, each identifier corresponding to an invitee to an event;

obtaining, at the processor, a user profile for each of the plurality of identifiers, wherein each user profile comprises a value for each of a plurality of characteristics;

obtaining, at the processor, aggregate data representing the values associated with the plurality of user profiles of the invitees for one or more selected characteristics;

generating, at the processor, a graphical representation of the aggregate data for the values associated with the plurality of user profiles of the invitees for each of the one or more selected characteristics; and outputting, for display on a client device, the graphical representation of the aggregate data.

15. The method of claim 14, wherein obtaining, at a processor, a plurality of identifiers, each identifier corresponding to an invitee to an event comprises obtaining, at a processor, a plurality of identifiers, each identifier corresponding to an invitee to an event, wherein the plurality of identifiers comprises identifiers for all of the invitees to the event; and wherein obtaining, at the processor, a user profile for each of the plurality of identifiers, wherein each user profile comprises a value for each of a plurality of characteristics comprises obtaining, at the processor, a user profile for all of the invitees to the event, wherein each user profile comprises a value for each of a plurality of characteristics.

16. The method of claim 14, wherein obtaining, at a processor, a plurality of identifiers, each identifier corresponding to an invitee to an event comprises obtaining, at a processor, a plurality of identifiers, each identifier corresponding to an invitee to an event, wherein the plurality of identifiers comprises identifiers for all of the invitees who have accepted invitations to the event; and wherein obtaining, at the processor, a user profile for each of the plurality of identifiers, wherein each user profile comprises a value for each of a plurality of characteristics comprises obtaining, at the processor, a user profile for all of the invitees who have accepted invitations to the event, wherein each user profile comprises a value for each of a plurality of characteristics.

17. The method of claim 14, wherein obtaining, at a processor, a plurality of identifiers, each identifier corresponding to an invitee to an event comprises obtaining, at a processor, a plurality of identifiers, each identifier corresponding to an invitee to an event, wherein the plurality of identifiers comprises identifiers for all of the invitees who have tentatively accepted invitations to the event; and wherein obtaining, at the processor, a user profile for each invitee to the event, wherein each user profile comprises a value for each of a plurality of characteristics comprises obtaining, at the processor, a user profile for all of the invitees who have tentatively accepted invitations to the event, wherein each user profile comprises a value for each of a plurality of characteristics.

18. The method of claim 14, wherein obtaining, at a processor, a plurality of identifiers, each identifier corresponding to an invitee to an event comprises obtaining, at a processor, a plurality of identifiers, each identifier corresponding to an invitee to an event, wherein the plurality of identifiers comprises identifiers for all of the invitees who have declined invitations to the event; and wherein obtaining, at the processor, a user profile for each of the plurality of identifiers, wherein each user profile comprises a value for each of a plurality of characteristics comprises obtaining, at the processor, a user profile for all of the invitees who have declined invitations to the event, wherein each user profile comprises a value for each of a plurality of characteristics.

19. The method of claim 14, wherein obtaining, at a processor, a plurality of identifiers, each identifier corresponding to an invitee to an event comprises obtaining, at a processor, a plurality of identifiers, each identifier corresponding to an invitee to an event, wherein the plurality of identifiers comprises identifiers for all of the invitees who have not responded to invitations to the event; and wherein obtaining, at the processor, a user profile for each of the plurality of identifiers, wherein each user profile comprises a value for each of a plurality of characteristics comprises obtaining, at the processor, a user profile for all of the invitees who have not responded to invitations to the event, wherein each user profile comprises a value for each of a plurality of characteristics.

20. The method of claim 14, wherein obtaining, at a processor, a plurality of identifiers, each identifier corresponding to an invitee to an event comprises obtaining, at a processor, a plurality of identifiers, each identifier corresponding to an invitee to an event, wherein the plurality of identifiers comprises identifiers for all of the invitees who attended the event; and wherein obtaining, at the processor, a user profile for each of the plurality of identifiers, wherein each user profile comprises a value for each of a plurality of characteristics comprises obtaining, at the processor, a user profile for all of the invitees who attended the event, wherein each user profile comprises a value for each of a plurality of characteristics.

* * * * *